Oct. 14, 1958 M. F. PETERS 2,856,151
FLUID VALVE SEALS
Filed March 15, 1957
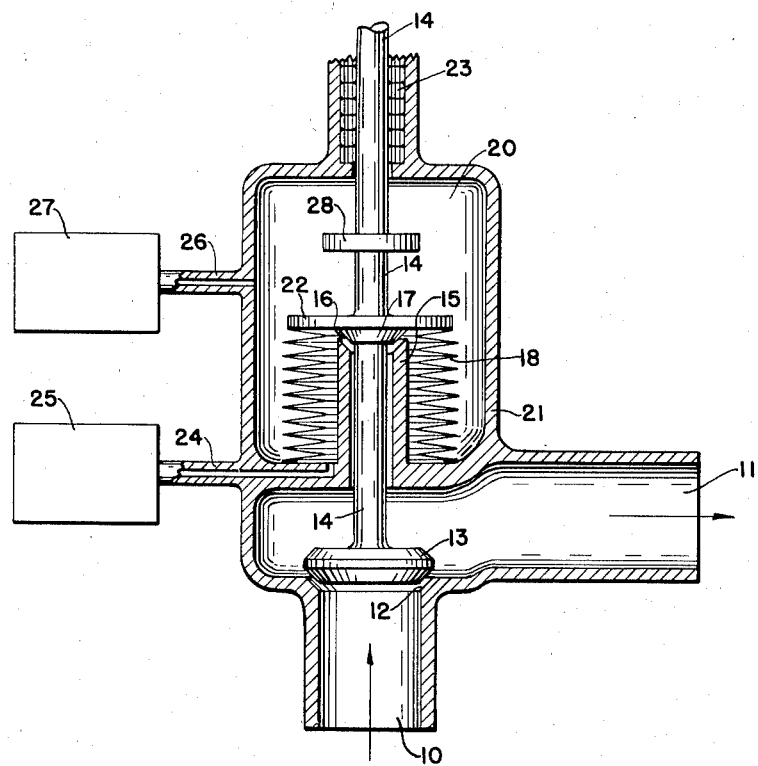
MELVILLE F. PETERS
INVENTOR
ATTORNEY

United States Patent Office 2,856,151
Patented Oct. 14, 1958

2,856,151

FLUID VALVE SEALS

Melville F. Peters, Livingston, N. J.

Application March 15, 1957, Serial No. 646,311

7 Claims. (Cl. 251—330)

This invention is a continuation-in-part of my prior application, Serial No. 195,861, filed November 15, 1950 now abandoned.

This invention relates to a valve having a sealing structure which is arranged to prohibit escape of fluid passing through the valve. It has particular reference to means for equalizing pressures on one or both sides of an expansible bellows whereby the tendency to fail is lessened and if failure does occure the escape of fluid is prohibited.

There are many applications in industrial and military services where equipment is used with valve controls to regulate the flow of acid or other destructive fluids. In atomic energy installations it is important that all fluids carrying chemicals which give off penetrating radiations be confined to a conveying system which cannot leak. The bellows seal is the only sure means of efficiently isolating the exterior portions of a movable valve stem from the valve fluid. Failure of the bellows, when it does occur, may render the entire plant inoperative and present a great hazzard to personnel.

Prior valves which employed bellows to isolate the valve fluid from the packing gland and the atmosphere were constructed in a manner which applied the full fluid pressure to the inside portion of the bellows, thereby placing the bellows walls under a continual strain with the possibility of rupture at any time, particularly when transient pressure pulses are transmitted in the fluid.

The present invention employs a bellows in the usual manner to completely isolate a portion of the valve from the fluid passing through the valve and in addition includes a means for applying pressure to the exterior of the bellows to equalize the pressure stress and substantially eliminate the tendency to rupture. The invention also includes a means for relieving the pressure from the interior of the bellows when the valve is closed.

One of the objects of this invention is to provide an improved valve which avoids one or more of the disadvantages and limitations of prior art arrangements.

Another object of the invention is to improve bellows valves so that the tendency to rupture the bellows is substantially eliminated.

Another object of the invention is to protect the bellows in a valve by applying an equalizing pressure to the exterior surface of the bellows.

Another object of the invention is to enable a valve operator to drain and clean the interior surface of a bellows when the valve is closed.

Still another object of the invention is to establish a pressure gradient between the interior and the exterior of a bellows seal in a high pressure valve so that the tendency to rupture the bellows is greatly reduced.

Another object of the invention is the provision of a system of primary and secondary seals, the latter being effective to seal a valve chamber independently of the primary sealing agency, thus providing emergency protection under certain conditions, as for example, when destructive fluids are flowing past an open valve.

For a better understanding of the present invention, together with other and further objects therewith, reference is made to the following description taken in connection with the accompanying drawings.

The figure is a cross sectional view of a valve showing, a primary sealing means, a secondary sealing means, and a bellows seal which isolates the packing gland from the fluid passing through the valve from the inlet to the outlet pipe.

Referring now to the drawing, the valve includes an inlet pipe 10, an outlet pipe 11, and a primary valve seat 12 which is closed by a gate disk 13 mounted on the lower end of a valve stem 14 which is connected to an operating means (not shown) exterior of the valve assembly. The valve stem may be moved by a manual or automatic translating means. The lower portion of the valve stem 14 is surrounded by a cylindrical baffle tube 15 having a secondary valve seat 16 at its top opening. This seat is closed by a gate 17 whenever gate 13 closes seat 12 and thereby provides a double seal against the leakage of dangerous or corrosive fluids from pipe 10.

Stem 14 and valve seat 16 are further provided with additional sealing means in the form of a high pressure multiple diaphragm or bellows 18 which is mounted in valve cavity 20. One end portion of the bellows is sealed to the inside of valve housing 21 while the other portion is sealed to a disk 22 which is formed integral with stem 14 or is welded to it.

The upper part of stem 14 passes through a packing gland which is sealed by packing material 23. This seal provides an aligning means for the stem 14 but is not entirely leak proof, especially when the pressure within valve cavity 20 is high.

When the valve is open, fluid from pipe 10 passes directly to pipe 11, and this fluid also fills the space within cylindrical baffle tube 15 and the space within the bellows 18. The fluid cannot get into the interior of valve cavity 20 nor make contact with the packing material 23 as long as the bellows remains intact.

When the valve is closed, pipes 10 and 11 are isolated from each other and piston gate 17 moves into contact with seat 16, isolating pipe 11 from the interior of bellows 18. Since pipe 11 may contain fluid under high pressure, a means of relieving the pressure within the bellows 18 is provided by a small diameter tube 24 formed in the valve casing which connects the inside volume of the bellows with an exterior pressure system 25 shown in block form.

The interior of the valve, outside bellows 18, forming valve cavity 20 is connected by a second tube 26 so that the pressure within this valve cavity may be regulated as desired by an exterior pressure system 27 shown in block form. A collar 28 is secured to stem 14 as indicated, to act as a stop when the valve is fully opened.

When this valve is in operation and is carrying a poisonous or destructive fluid, the tube 24 may be connected to a storage container having a neutral fluid (such as nitrogen) at a pressure equal to or slightly higher than the pressure in pipe 11. This condition insures the absence of the destructive fluid from the interior of bellows 18. At the same time, the same pressure from the same storage container may be applied to tube 26, thereby equalizing the pressure on both sides of the bellows and eliminating all tendency to rupture. The neutral fluid under these conditions slowly leaks through packing 23 but since the fluid is neutral its escape is unimportant.

The pressures applied through tubes 24 and 26 may be varied within a wide range of values to accommodate various operating conditions. Since the bellows is capable of withstanding moderate pressures without rupture or failure, the pressure in valve cavity 20, maintained through tube 26, can be considerably less than the pressure within the bellows, maintained by tube 24.

Having thus fully described the invention, what is claimed as new and desired to be secured by Letters Patent of the United States is:

1. A valve assembly comprising, a first housing containing a primary valve seat, inlet and outlet pipes disposed on opposite sides of said seat, a second housing mounted adjoining the first, a valve stem mounted for axial movement and including a primary gate cooperating with said primary seat to isolate said inlet and outlet pipes, said stem also including a secondary gate which cooperates with a secondary valve seat to isolate said first and second housings when the primary valve is closed, a collapsible bellows mounted in the second housing and surrounding said valve stem with one portion of the bellows sealed to the second housing and another portion sealed to said stem, a first tubular means which connects the space inside the bellows with a first exterior pressure system, and a second tubular means which connects the space inside the second housing with a second exterior pressure system.

2. A valve assembly comprising, a first housing containing a primary valve seat, inlet and outlet pipes disposed on opposite sides of said seat, a second housing mounted adjoining the first, a valve stem arranged for axial movement and positioned so as to traverse said second housing with a packing gland enclosing said stem at the stem portion adjacent to the atmosphere, said valve stem including a primary gate cooperating with said primary seat to isolate said inlet and outlet pipes, said stem also including a secondary gate which cooperates with a secondary valve seat to isolate said first and second housings when the primary valve is closed, a collapsible bellows mounted in the second housing and surrounding the valve stem with one portion of the bellows sealed to the second housing and another portion of the bellows sealed to the valve stem, a first tubular means which connects the space inside the bellows with a first exterior pressure system, and a second tubular means which connects the space inside the second housing with a second exterior pressure system.

3. A valve assembly comprising, a first housing containing a primary valve seat, inlet and outlet pipes disposed on opposite sides of said seat, a second housing mounted adjoining the first, a valve stem mounted for axial movement and including a primary gate cooperating with said primary seat to isolate said inlet and outlet pipes, said stem also including a secondary gate which cooperates with a secondary valve seat to isolate said first and second housings when the primary valve is closed, said valve stem enclosed in a tubular housing at the position where it enters the second housing, a collapsible bellows mounted in the second housing and surrounding said valve stem with one end of the bellows sealed to the second housing and the other end sealed to a disk carried by the stem, a first tubular means which connects the space inside the bellows with a first exterior pressure system, and a second tubular means which connects the space inside the second housing with a second exterior pressure system.

4. A valve assembly in accordance with claim 3 wherein said first tubular means and said first exterior pressure system include a means for admitting a neutral fluid to the inside of the bellows when the valves are open.

5. A valve assembly in accordance with claim 3 wherein said second tubular means and said second exterior pressure system include a means for admitting a neutral fluid to the inside of said second housing.

6. A valve assembly in accordance with claim 3 wherein said first and second tubular means and said first and second exterior pressure systems include a means for applying a neutral fluid to both sides of the bellows at a pressure equal to the average pressure in the first housing.

7. A valve assembly in accordance with claim 3 wherein said first tubular means and said first exterior pressure system include a means for draining the fluid from the space inside the bellows when the valves are closed.

References Cited in the file of this patent

UNITED STATES PATENTS

| 2,444,703 | Jones | July 6, 1948 |
| 2,495,081 | Thomas | Jan. 17, 1950 |